F. W. MEAD.
FRAME FOR MOTOR VEHICLES.
APPLICATION FILED JUNE 1, 1914.
1,185,230.
Patented May 30, 1916.
4 SHEETS—SHEET 4.
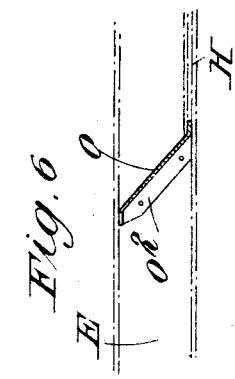
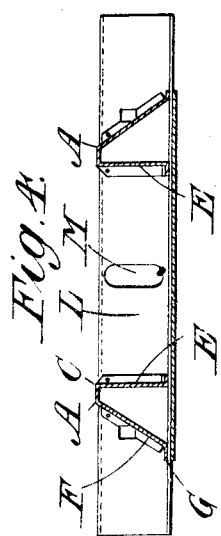
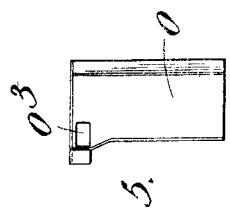
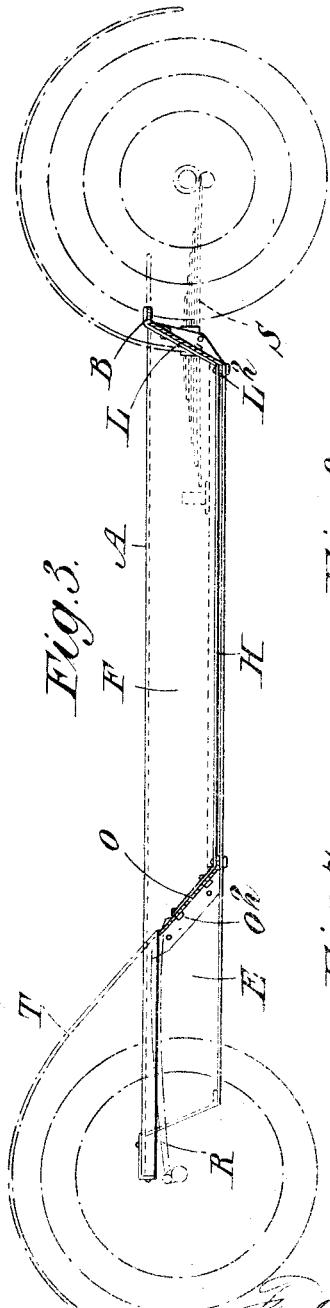
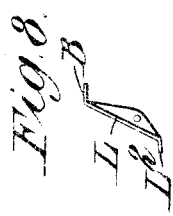
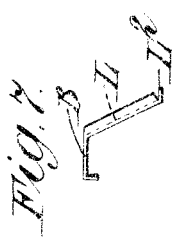

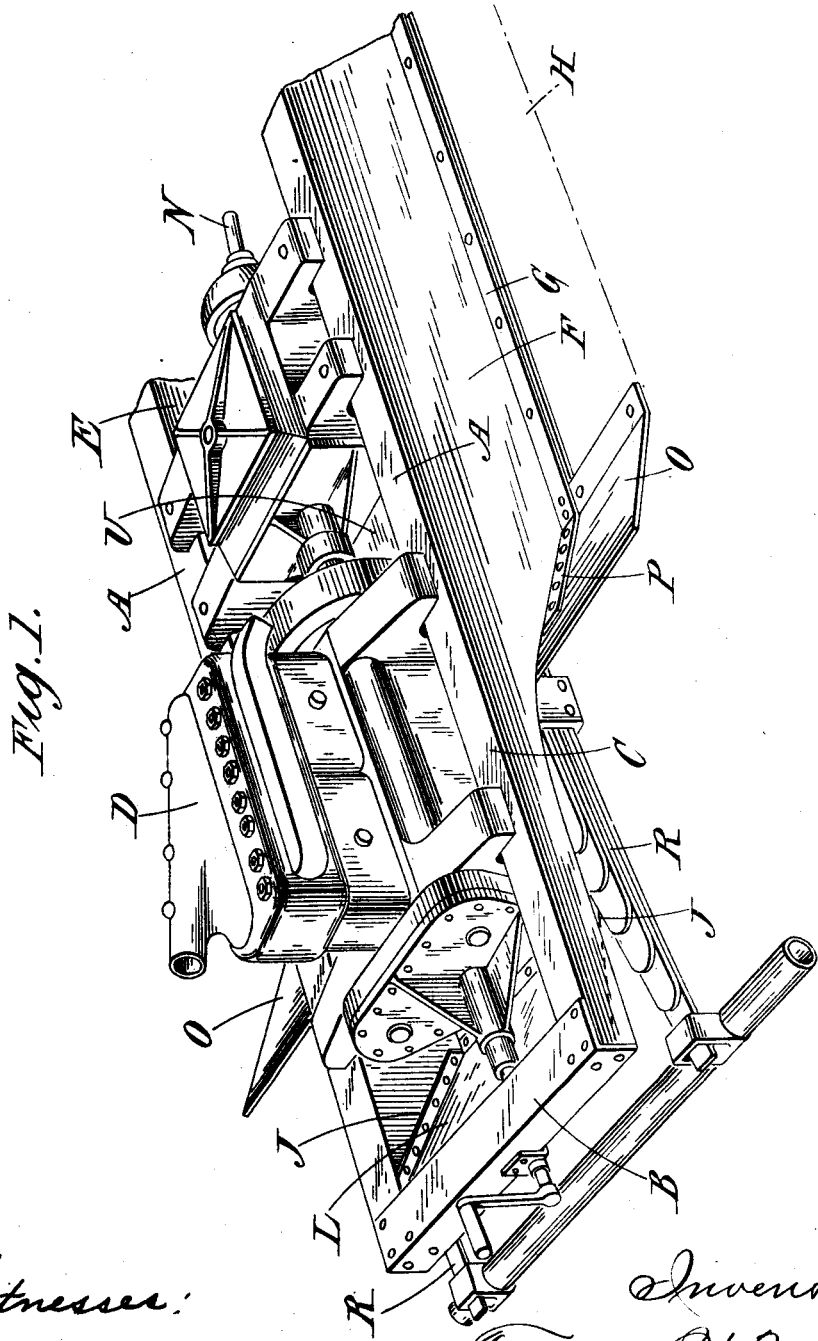

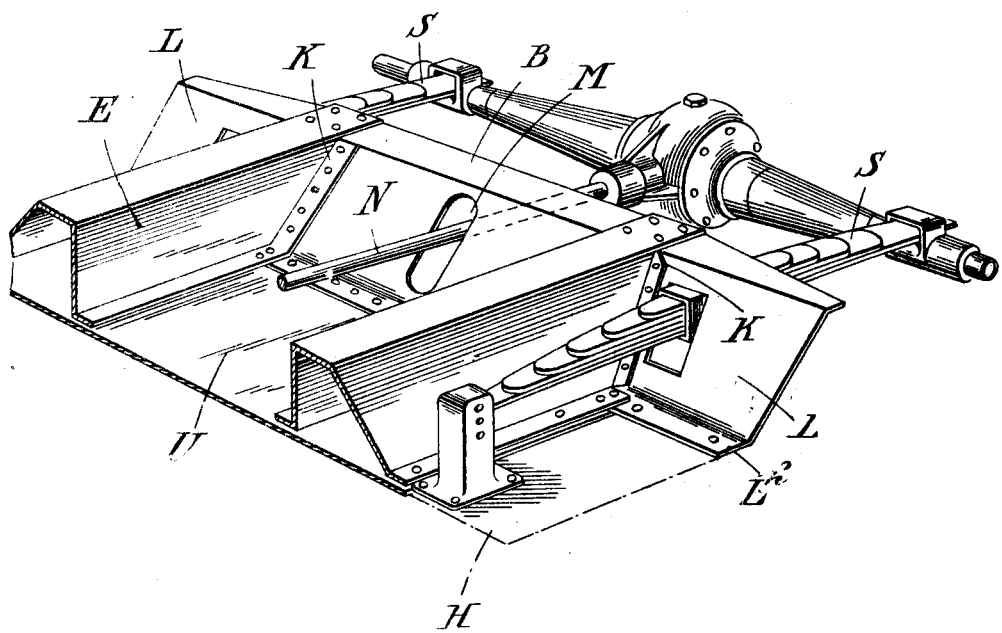

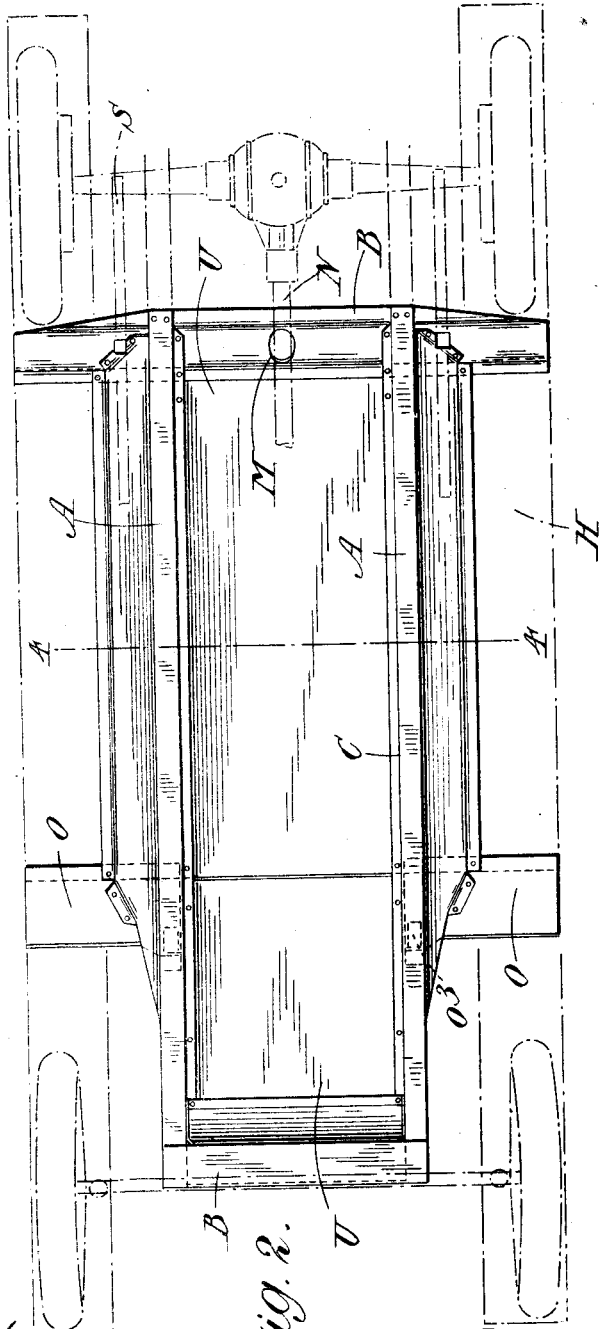

UNITED STATES PATENT OFFICE.

FREDERICK WILLIAM MEAD, OF BIRMINGHAM, ENGLAND.

FRAME FOR MOTOR-VEHICLES.

1,185,230.  Specification of Letters Patent.  Patented May 30, 1916.

Application filed June 1, 1914. Serial No. 842,222.

*To all whom it may concern:*

Be it known that I, FREDERICK WILLIAM MEAD, a subject of the King of Great Britain, residing at Rushy Lane, Tyseley, Birmingham, Warwickshire, England, have invented certain new and useful Improvements in Frames for Motor-Vehicles, of which the following is a specification.

This invention relates to frames for motor vehicles and has for its object to provide an improved construction possessing a number of advantages over frames of the ordinary types.

The frame, according to the present invention, provides a suitable platform for the engine, gearing, and bodywork; also an undershield protecting the mechanism, and valances filling the space between the platform parts and the running boards, the whole being constructed from sheet metal which does not require pressing in dies. The material is bent to the required shape by means of bending machinery, and all bending is effected along straight lines.

In the accompanying drawings, Figure 1 is a perspective view showing the front portion of a frame constructed in accordance with this invention with the engine, gear box, springs, and axle attached. Fig. 1ª is a perspective view of the rear portion of the frame and the rear axle. Fig. 2 is a plan view of the frame, the front and rear axles, wheels, etc., being shown in dotted lines, and Fig. 3 is a side elevation, while Fig. 4 is a cross section on the line 4—4 of Fig. 2, looking toward the rear. Fig. 5 is a plan view of one of the transverse plates, used at the sides of the frame. Fig. 6 is a side view of the same. Fig. 7 is an end view of the front transverse member, and Fig. 8 an elevation of the rear transverse member.

Like letters indicate like parts throughout the drawings.

The frame consists of a pair of longitudinal members A and a pair of transverse members B. The longitudinal members are counterparts of one another and each is roughly of channel shape, as is clear from Fig. 4. The bed of the channel, which is inverted, *i. e.*, open downward, consists of a flat strip C which provides the platform surface for the engine, etc., D. One edge E of the strip A is bent vertically downward at right angles or approximately so to the platform surface C. This part E forms a deep stiffening web.

The other side F of the platform surface C is also bent downward at a suitable angle, say 45° to the horizontal, and its extreme edge G is bent over horizontally, parallel to the platform surface C. This horizontal part G has attached to it the running boards H. It will be seen that all the lines upon which bending is effected are straight and the intermediate surfaces are straight so that each longitudinal member A can be formed out of a wide strip of sheet metal passed through a bending machine, which is a cheap process of manufacture, as special dies or the like are not required.

Similarly, the transverse members B are made out of metal strips bent along straight lines. The ends of the parts E and F of the longitudinal members are beveled off, as shown at J and K in Figs. 1 and 1ª respectively. These parts are flanged as shown. The transverse members B are provided with inclined webs L (see Figs. 7 and 8) which are bolted or riveted to the flanges at J and K and the webs L may be formed with a horizontal web as shown at $L^2$ providing a further attachment surface. The flanges $L^2$ and the rear transverse member B are attached to the running boards H as will be clearly seen in Figs. 1 and 1ª.

When the frame is constructed in this way a kind of trough is formed between the longitudinal members, as is best seen in Figs. 2 and 4, and the lower parts of the engine, gearing, etc., lie in this trough. The rear transverse member is slotted at M for the passage of the propeller shaft N or the equivalent, and the platform parts C of the longitudinals may project beyond the transverse members B to carry the radiator or body.

In the construction illustrated the front transverse member B is arranged at the end of the longitudinal members A and the radiator may be mounted on the top of the transverse member. In such a case plates O are arranged close to the engine which plates are attached to the running boards and to flanges P formed on the valances F. The plates O pass right across the channel formed by each inverted longitudinal member, as is seen in Fig. 2, and the end of each is flanged at $O^2$ and attached to the vertical part E of the longitudinal member. Each plate is slotted as shown at O³ for the passage of the front springs R and holes are also provided in the rear transverse member for the passage of the rear springs S as is shown clearly in fig. 1ª. The springs are preferably of the kind which are attached to the axle at one end, and to the frame at one or two points.

The object of inclining the transverse parts O and L is that these may, if desired, lie flush with the lower parts of the mudguards T surrounding the wheels. The transverse parts O and L extend to the edges of the running boards and they may lie tangentially to the mudguards, the guards being attached to the transverse parts. In most cases it is these projecting parts which are perforated for the passage of the main springs, particularly in the case of the rear springs S.

The trough formed between the longitudinal members A may be inclosed underneath by plates U. There are preferably two of such plates, and either or both may be detachable so as to form a removable undershield.

It will be gathered that the complete frame is very stiff and can consequently be extremely light in spite of the fact that the cost of production is low owing to the cheap process of manufacture.

The parts F, which form the valances, may be either flat, as shown, or may be curved transversely.

What I claim as my invention and desire to secure by Letters Patent is:—

1. A frame for a motor vehicle comprising longitudinal members each of which is bent to channel shape along straight lines and comprising a flat portion or strip adapted to support the engine and body, a deep stiffening portion or web extending downwardly at a right angle to said flat supporting strip, and a portion extending diagonally downward from said flat supporting strip.

2. A frame for a motor vehicle comprising longitudinal members each of which is bent to channel shape along straight lines and comprising a flat portion or strip adapted to support the engine and body, a deep stiffening portion or web extending downwardly at a right angle to said flat supporting strip, and a portion extending diagonally downward from said flat supporting strip, the lower edge of said diagonally extending portion being bent horizontally parallel to the said flat strip for attachment of a running board.

3. In a frame for a motor vehicle, the combination with longitudinal members each of which is bent to channel shape along straight lines and comprising a flat portion or strip adapted to support the engine and body, a deep stiffening portion or web extending downwardly at a right angle to said flat supporting strip, and a portion extending diagonally downward from said flat supporting strip, the ends of the said vertical stiffening portion and diagonal portion being beveled off and bent to form flanges, of transverse members each of which is bent to form an inclined web which is bolted to the said flanges at the ends of each longitudinal member.

4. In a frame for a motor vehicle, the combination with longitudinal members each of which is bent to channel shape along straight lines and comprising a flat portion or strip adapted to support the engine and body, a deep stiffening portion or web extending downwardly at a right angle to said flat supporting strip, and a portion extending diagonally downward from said flat supporting strip, the ends of the said vertical stiffening portion and diagonal portion being beveled off and bent to form flanges, of transverse members, each of which is bent to form an inclined web which is bolted to the said flanges at the ends of each longitudinal member, plates extending transversely across the channels formed by the longitudinal members, each plate being flanged at one end and attached to the vertical stiffening rib of the corresponding longitudinal member, each plate being slotted for the passage of a spring, substantially as set forth.

5. In a frame for a motor vehicle, the combination with longitudinal members each of which is bent to channel shape along straight lines and comprising a flat portion or strip adapted to support the engine and body, a deep stiffening portion or web extending downwardly at a right angle to said flat supporting strip, and a portion extending diagonally downward from said flat supporting strip, the ends of the said vertical stiffening portion and diagonal portion being beveled off and bent to form flanges, of transverse members each of which is bent to form an inclined web which is bolted to the said flanges at the ends of each longitudinal member, plates extending transversely across the channels formed by the longitudinal members, each plate being flanged at one end and attached to the vertical stiffening rib of the corresponding longitudinal member, each plate being slotted for the passage of a spring, and running boards attached to the said plates and also to the horizontal flanges on the inclined webs of the transverse members.

6. In a frame for a motor vehicle, the combination of longitudinal members bent to channel shape along straight lines and comprising a flat portion or strip, a deep stiffening portion or web extending downwardly at a right angle to said flat strip, beveled ends to said longitudinal members, flanges to said beveled ends and transverse members bent along straight lines and attached to said flanges, substantially as set forth.

7. In a frame for a motor vehicle, the combination of longitudinal members bent to channel shape along straight lines, beveled ends to said longitudinal members, a transverse member attached to the rear beveled end, a running board attached to said transverse member, a bent iron bar attached to the front beveled end of said longitudinal members, and plates attached to said longitudinal members and to said running boards, substantially as set forth.

In testimony whereof I have signed my name to this specification in the presence of two subscribing witnesses.

FREDERICK WILLIAM MEAD.

Witnesses:
 SOPHIA BENSON,
 ERNEST HARKER.